US012276086B2

(12) United States Patent
Fukuda

(10) Patent No.: US 12,276,086 B2
(45) Date of Patent: Apr. 15, 2025

(54) HYDRAULIC SYSTEM FOR WORKING MACHINE

(71) Applicant: KUBOTA CORPORATION, Osaka (JP)

(72) Inventor: Yuji Fukuda, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 209 days.

(21) Appl. No.: 17/499,365

(22) Filed: Oct. 12, 2021

(65) Prior Publication Data

US 2022/0112687 A1 Apr. 14, 2022

(30) Foreign Application Priority Data

Oct. 13, 2020 (JP) ................................ 2020-172796

(51) Int. Cl.
*E02F 9/22* (2006.01)
*F15B 11/024* (2006.01)

(52) U.S. Cl.
CPC .......... *E02F 9/2217* (2013.01); *F15B 11/024* (2013.01); *E02F 9/2282* (2013.01); *F15B 2211/3116* (2013.01); *F15B 2211/3133* (2013.01); *F15B 2211/40507* (2013.01)

(58) Field of Classification Search
CPC ............................................... F15B 2211/3133
See application file for complete search history.

(56) References Cited

U.S. PATENT DOCUMENTS

| | | | | |
|---|---|---|---|---|
| 4,974,349 A * | 12/1990 | Timmons | E02F 3/962 37/403 |
| 5,218,897 A * | 6/1993 | Shirai | F15B 11/024 91/436 |
| 5,791,226 A * | 8/1998 | Chung | F15B 13/021 91/436 |
| 10,161,109 B2 * | 12/2018 | Iwasaki | E02F 9/2217 |
| 2019/0301142 A1 * | 10/2019 | Fukuda | E02F 3/3414 |
| 2020/0190770 A1 | 6/2020 | Nakajima | |

FOREIGN PATENT DOCUMENTS

| | | |
|---|---|---|
| JP | 56-035806 A | 4/1981 |
| JP | 2010-014244 A | 1/2010 |
| JP | 2019-002531 A | 1/2019 |
| JP | 2019-060485 A | 4/2019 |

OTHER PUBLICATIONS

Office Action issued Jul. 11, 2023 in Japanese family member application No. 2020-172796 and English language translation thereof.

* cited by examiner

*Primary Examiner* — Kenneth Bomberg
*Assistant Examiner* — Michael Quandt
(74) *Attorney, Agent, or Firm* — Greenblum & Bernstein, P.L.C.

(57) ABSTRACT

A hydraulic system for a working machine includes a hydraulic actuator configured to be operated by operation fluid, a control valve connected to the hydraulic actuator, and a communication fluid line for fluid communication between the hydraulic actuator and the control valve. The control valve includes a first supply path to guide the operation fluid toward the hydraulic actuator; a regeneration path to guide the operation fluid having been returned to the control valve from the hydraulic actuator, to the first supply path; and a branched path that branches from the regeneration path and supplies operation fluid to outside of the control valve.

14 Claims, 6 Drawing Sheets

HYDRAULIC SYSTEM FOR WORKING MACHINE

CROSS-REFERENCE TO RELATED APPLICATIONS

The present application claims priority under 35 U.S.C. § 119 to Japanese Patent Application No. 2020-172796, filed Oct. 13, 2020. The content of this application is incorporated herein by reference in their entirety.

BACKGROUND OF THE INVENTION

1. Field of the Invention

The present invention relates to a hydraulic system and a control valve for a working machine such as a skid-steer loader, a compact track loader, and the like.

2. Description of the Related Art

A hydraulic system for a working machine has conventionally been known as disclosed in Japanese Patent Application Publication No. 2019-060485 (which is referred herein to as Patent Document 1). The working machine disclosed in Patent Document 1 includes a hydraulic pump that outputs operation fluid; a first hydraulic actuator; a second hydraulic actuator; a first control valve having an input port into which operation fluid is supplied to the first hydraulic actuator so as to control the first hydraulic actuator by the supplied operation fluid; a second control valve provided on a downstream side of the first control valve for controlling the second hydraulic actuator; a first fluid line connected between the first control valve and the second control valve for supplying return fluid, which is the operation fluid returning from the first hydraulic actuator to the first control valve, to the second control valve; a second fluid line that, apart from the first fluid line, connected between the first control valve and the second control valve, which communicates with the first fluid line; and a third fluid line that communicates with the second fluid line and that returns the return fluid of the first fluid line to the input port.

SUMMARY OF THE INVENTION

The working machine disclosed in Patent Document 1 is configured to allow the return fluid to flow back to the second fluid line via the third fluid line so as to regenerate the operation fluid from the cylinder rod side to the cylinder bottom side, if the pressure on the upstream control valve (i.e., the second control valve) is high, that is, if the back pressure downstream of the first control valve is high. However, if the back pressure downstream of the first control valve is low (or insufficiently high), the operation fluid cannot be regenerated, which may reduce the operation speed of the hydraulic actuator.

The present invention was made to solve the technical problem of the existing technology as described above, and an object of the invention is to provide a hydraulic system for a working machine, which can readily facilitate the quick operation of a hydraulic actuator.

The following is the technical means of the present invention to solve the technical problem described above.

A hydraulic system for a working machine according to one aspect of the present invention includes a hydraulic actuator configured to be operated by operation fluid, a control valve connected to the hydraulic actuator, and a communication fluid line for fluid communication between the hydraulic actuator and the control valve. The control valve includes a first supply path to guide the operation fluid toward the hydraulic actuator, a regeneration path to guide the operation fluid having been returned to the control valve from the hydraulic actuator, to the first supply path, and a branched path that branches from the regeneration path and supplies operation fluid to outside of the control valve.

The control valve is configured to be switched between a first position at which the hydraulic actuator contracts and a second position at which the hydraulic actuator extends, and the operation fluid is guided through the first supply path, the regeneration path, and the branched path when the control valve is at the second position.

The branched path is connected to an output port through which the operation fluid flows out, for supplying the operation fluid toward another control valve disposed downstream of the control valve.

The branched path is connected to a discharge port that communicates with a discharge fluid line for discharging the operation fluid to outside of the control valve.

The branched path also has a first throttle.

The control valve further comprises a second input port through which the operation fluid flows in, and a second supply path connected to the second input port, wherein the branched path is connected with the second supply path.

The second supply path has a second throttle.

The hydraulic system further includes first and second working tools provided on a boom, wherein the first working tool is a bucket, and the hydraulic actuator is a bucket cylinder for actuating the bucket.

A hydraulic system for a working machine according to another aspect of the present invention includes a hydraulic actuator configured to be operated by operation fluid, a control valve connected to the hydraulic actuator, first and second communication fluid lines for fluid communication between the hydraulic actuator and the control valve, and a discharge fluid line for discharging the operation fluid. The control valve includes first and second communication ports connected to the first and second communication fluid lines, respectively, first and second input ports through which the operation fluid flows in, an output port through which the operation fluid flows out, a discharge port connected to the discharge fluid line, a first supply path for fluid communication between the first input port and the second communication port, a regeneration path for fluid communication between the first supply path and the first communication port, and a branched path for fluid communication between the regeneration path and the output port.

A hydraulic system for a working machine according to another aspect of the present invention includes a hydraulic actuator configured to be operated by operation fluid, a control valve connected to the hydraulic actuator, first and second communication fluid lines for fluid communication between the hydraulic actuator and the control valve, and a discharge fluid line for discharging the operation fluid. The control valve includes first and second communication ports connected to the first and second communication fluid lines, respectively, first and second input ports through which the operation fluid flows in, an output port through which the operation fluid flows out, a discharge port connected to the discharge fluid line, a first supply path for fluid communication between the first input port and the second communication port, a regeneration path for fluid communication between the first supply path and the first communication port, and a branched path for fluid communication between the regeneration path and the output port.

The control valve is configured to be switched from a neutral position to a first position for contracting the hydraulic actuator and a second position for extending the hydraulic actuator.

The operation fluid is guided from the first input port through the second supply path, the first communication port and the first communication fluid line to the hydraulic actuator, when the control valve is switched to the second position.

The operation fluid is guided from the hydraulic actuator to the first supply path through the first communication port and the regeneration path.

The operation fluid is guided from the regeneration path to the output port through the branched path.

The operation fluid is guided from the output port to another control valve disposed downstream of the control valve.

The operation fluid is discharged through the discharge port and the discharge fluid line.

The control valve further includes a second supply path for fluid communication between the second input port and the output port through the branched path.

A hydraulic system for a working machine according to further another aspect of the present invention includes a hydraulic actuator configured to be operated by operation fluid, a control valve connected to the hydraulic actuator, first and second communication fluid lines for fluid communication between the hydraulic actuator and the control valve, and a discharge fluid line for discharging the operation fluid. The control valve includes first and second communication ports connected to the first and second communication fluid lines, respectively, first and second input ports through which the operation fluid flows in, an output port through which the operation fluid flows out, a discharge port connected to the discharge fluid line, a first supply path for fluid communication between the first input port and the second communication port, a regeneration path for fluid communication between the first supply path and the first communication port, and a third supply path for fluid communication between the second input port and the output port.

The control valve further comprises a branched path for fluid communication between the regeneration path and the discharge port.

The control valve is configured to be switched from a neutral position to a first position for contracting the hydraulic actuator and a second position for extending the hydraulic actuator.

The operation fluid is guided from the first input port through the second supply path, the first communication port and the first communication fluid line to the hydraulic actuator, when the control valve is switched to the second position.

A hydraulic system for a working machine according to further another aspect of the present invention includes a hydraulic actuator configured to be operated by operation fluid, a control valve connected to the hydraulic actuator, first and second communication fluid lines for fluid communication between the hydraulic actuator and the control valve, and a discharge fluid line for discharging the operation fluid. The control valve includes first and second communication ports connected to the first and second communication fluid lines, respectively, first and second input ports through which the operation fluid flows in, an output port through which the operation fluid flows out, a discharge port connected to the discharge fluid line, a first supply path for fluid communication between the first input port and the second communication port, a regeneration path for fluid communication between the first supply path and the first communication port, and a third supply path for fluid communication between the second input port and the output port.

The control valve further comprises a branched path for fluid communication between the regeneration path and the discharge port.

The control valve is configured to be switched from a neutral position to a first position for contracting the hydraulic actuator and a second position for extending the hydraulic actuator.

The operation fluid is guided from the first input port through the second supply path, the first communication port and the first communication fluid line to the hydraulic actuator, when the control valve is switched to the second position.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
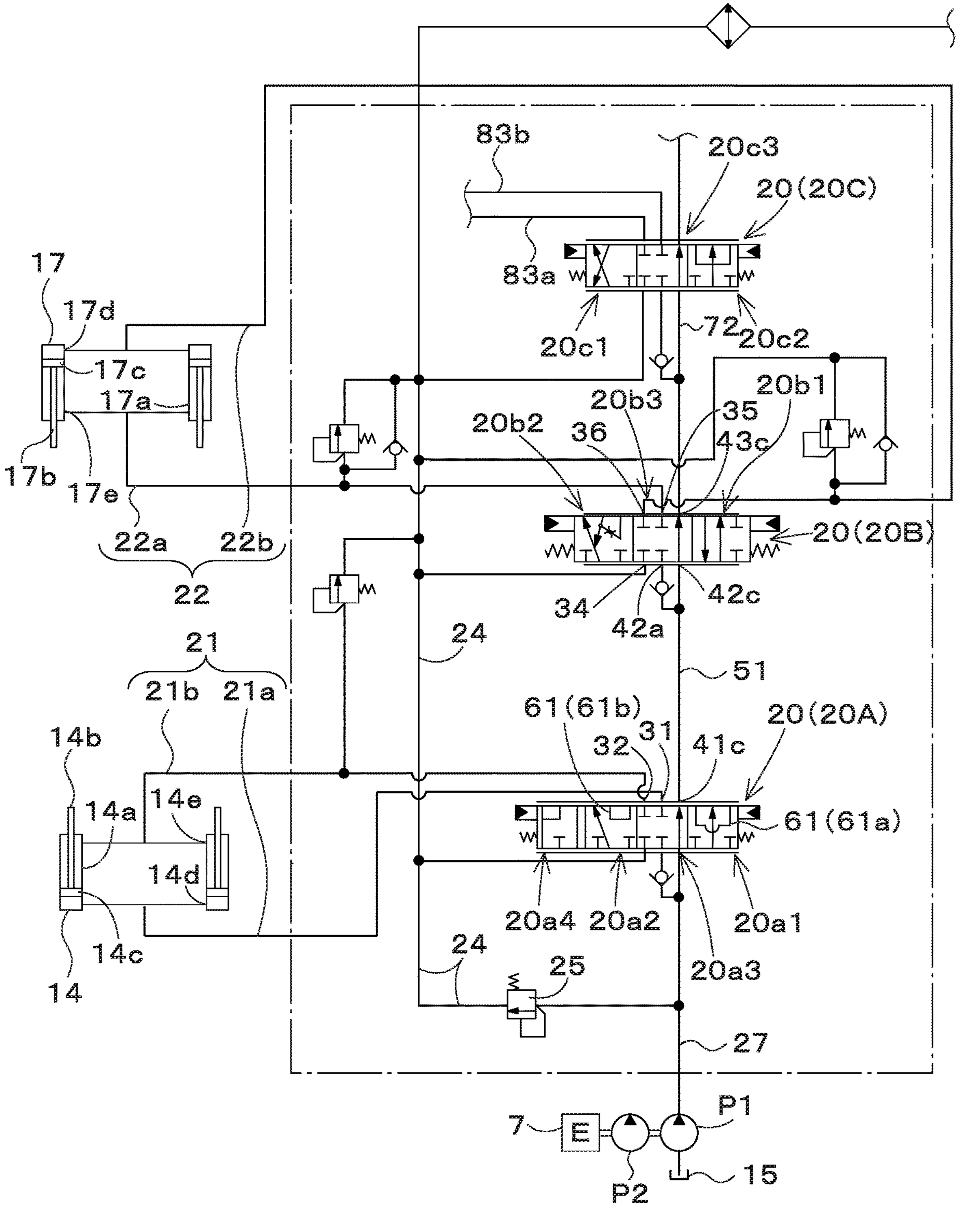
FIG. 1 illustrates a hydraulic system (hydraulic circuit) of a working machine.

The preferred embodiments of the present invention will now be described with reference to the accompanying drawings, wherein like reference numerals designate corresponding or identical elements throughout the various drawings. The drawings are to be viewed in an orientation in which the reference numerals are viewed correctly.

Hereinafter, preferred embodiments of the present invention will be described with appropriate reference to the drawings.

Figure 3:
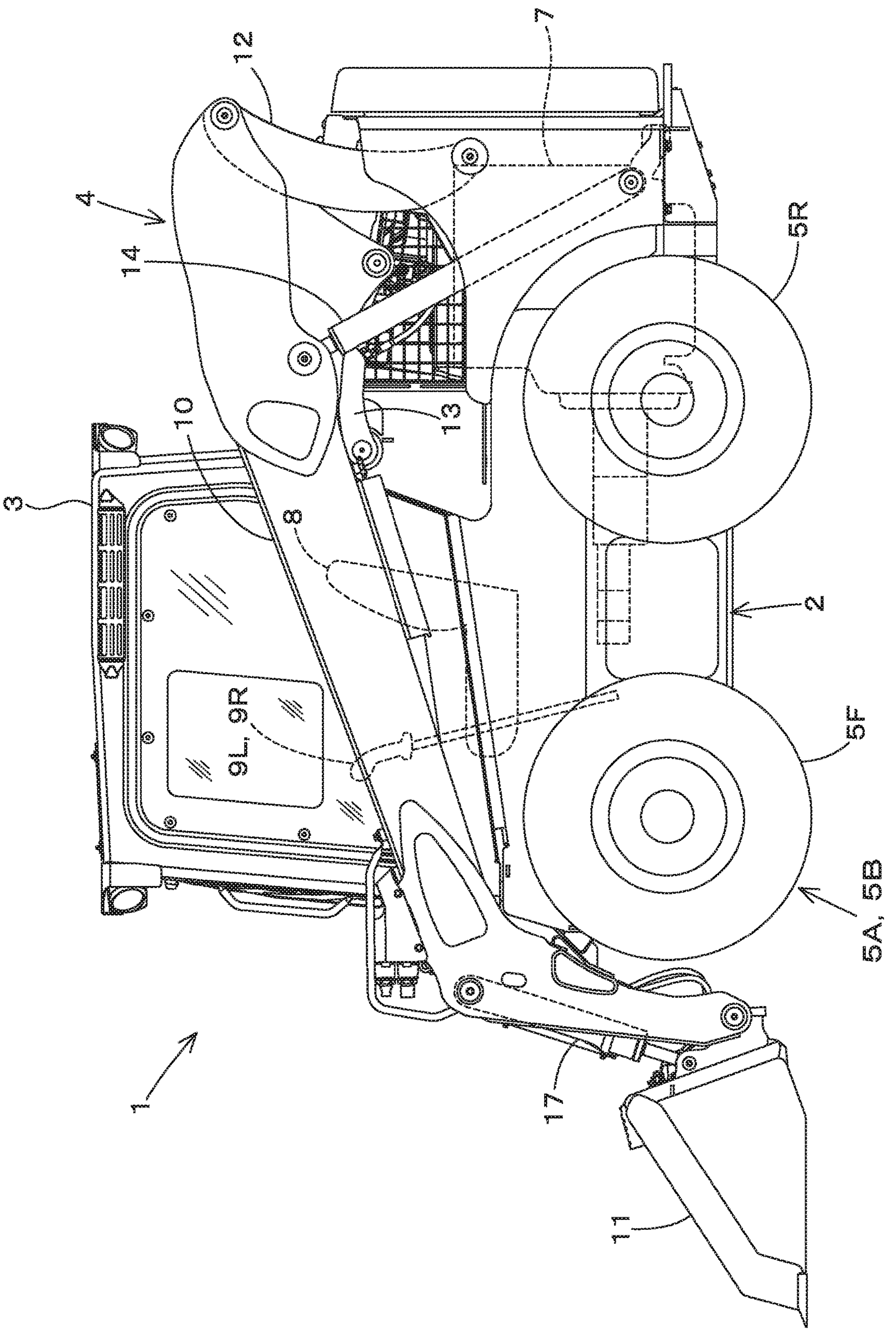
FIG. 3 is a general view of a skid-steer loader illustrated as an example of the working machine.

First, a working machine is described below, referring FIG. 3 showing a side view of a skid-steer loader as an example of the working machine according to the present invention. However, the working machine according to the present invention is not limited thereto, and may be any other types of the loaders, such as a compact track loader. Also, the working machine according to the present invention may be a working machine other than loaders.

The working machine 1 includes a machine body (vehicle body) 2, a cabin 3, a working device 4, and a pair of traveling devices 5A and 5B.

The cabin 3 is mounted on the machine body 2. An operator seat 8 is disposed at a rear portion of an inside of the cabin 3. In explanations of the embodiments of the present invention, a front side (a left side in FIG. 3) in view of the operator seated on the operator seat 8 of the working machine 1 is referred to as the front (a front side), a rear side (a right side in FIG. 3) in view of the operator seated on the operator seat 8 of the working machine 1 is referred to as the rear (a rear side), a left side (a front surface side in FIG. 3) in view of the operator seated on the operator seat 8 of the working machine 1 is referred to as the left (a left side), and a right side (a back surface side in FIG. 3) in view of the operator seated on the operator seat 8 of the working machine 1 is referred to as the right (a right side). In addition, a horizontal direction perpendicular to the front-to-rear direction will be referred to as a machine width direction. A direction extending from the center portion of the machine body 2 to the right portion or the left portion will be referred to as a machine outward direction. In other words, the machine outward direction is a machine width direction extending away from the machine body 2. In the explanation, a direction opposite to the machine outward direction is referred to as a machine inward direction. In other words, the machine inward direction is a machine width direction approaching the machine body 2.

The cabin 3 is mounted on the machine body 2. The working device 4 is a device configured to perform a work, and is mounted on the machine body 2. The traveling device 5A is a device configured to allow the machine body 2 to travel, and is disposed on the left side of the machine body 2. The traveling device 5B is a device configured to allow the machine body 2 to travel, and is disposed on the right side of the machine body 2. A prime mover 7 is disposed at a rear portion inside the machine body 2. The prime mover 7 is a diesel engine (an engine). It should be noted that the prime mover 7 is not limited to the engine and may be an electric motor or the like.

A traveling lever 9L is provided on the left side of the operator seat 8. A traveling lever 9R is provided on the right side of the operator seat 8. The left traveling lever 9L is used to operate the left travel device 5A, and the right traveling lever 9R is used to operate the right travel device 5B.

The working device 4 includes a boom 10, a bucket 11, a lift link 12, a control link 13, a boom cylinder 14 and a bucket cylinder 17. The boom 10 is provided on a lateral side of the machine body 2. The bucket 11 is provided on a distal end (a front end) of the boom 10. The lift link 12 and the control link 13 support a base portion (a rear portion) of the boom 10. The boom cylinder 14 drives the boom 10 upward and downward.

More specifically, the lift link 12, the control link 13, and the boom cylinder 14 are provided on the lateral side of the machine body 2. An upper portion of the lift link 12 is pivotally supported by the upper portion of the base portion of the boom 10. A lower portion of the lift link 12 is pivotally supported on the lateral side portion of the rear portion of the machine body 2. The control link 13 is disposed forward from the lift link 12. One end of the control link 13 is pivotally supported by a lower portion of the base portion of the boom 10, whereas the other end is pivotally supported by the machine body 2.

The boom cylinder 14 is a hydraulic cylinder that raises and lowers the boom 10. An upper portion of the boom cylinder 14 is pivotally supported by the front portion of the base portion of the boom 10. A lower portion of the boom cylinder 14 is pivotally supported by a lateral side of the rear portion of the machine body 2. The boom cylinder 14 extends and contracts in cooperation with the lift link 12 and the control link 13 so that the boom 10 swings upwardly and downwardly, respectively. The bucket cylinder 17 is a hydraulic cylinder that swings the bucket 11. The bucket cylinder 17 connects a left portion of the bucket 11 and a left boom, and connects a right portion of the bucket 11 and a right boom. It should be noted that, instead of the bucket 11, an auxiliary attachment, i.e., a working tool, such as a hydraulic crusher, a hydraulic breaker, an angle broom, an auger, a pallet fork, a sweeper, a mower, a snow blower, or the like may be attached to the distal end (front portion) of the boom 10.

In the present embodiment, the traveling devices 5A and 5B respectively are structured as wheeled traveling devices 5A and 5B each having a front wheel 5F and a rear wheel 5R. Also, the traveling devices 5A and 5B of a crawler type (including a semi-crawler type) may be employed as the traveling devices 5A and 5B.

Next, a hydraulic circuit for a working hydraulic system or a working devices such as the boom cylinder and the bucket cylinder provided on the working machine 1 such as the skid steer loader 1 will be described below.

The working hydraulic system is a system configured to actuate the boom 10, the bucket 11, the auxiliary attachment, and the like, and includes a plurality of control valves 20, a working hydraulic pump (first hydraulic pump) P1, as well as a second hydraulic pump P2, which is different from the first hydraulic pump P1, as illustrated in FIG. 1.

The first hydraulic pump P1 is a pump configured to be operated by the power of the prime mover 7, and is constituted of a fixed-displacement gear pump. The first hydraulic pump P1 is configured to output operation fluid (hydraulic oil) stored in a tank (an operation fluid tank) 15. The second hydraulic pump P2 is a pump configured to be operated by the power of the prime mover 7, and is constituted of a fixed-displacement gear pump. The second hydraulic pump P2 is configured to output the operation fluid stored in the tank (the operation fluid tank) 15. Especially, the second hydraulic pump P2 is configured to output the operation fluid for signals of or controlling the hydraulic system. The operation fluid for signals or for controlling the hydraulic system will be referred to as pilot oil.

A plurality of control valves 20 are provided to control various hydraulic actuators on the working machine 1. The hydraulic actuators are devices operable by the operation fluid, such as a hydraulic cylinder, a hydraulic motor, and the like. In this embodiment, the plurality of control valves 20 include a boom control valve 20A, a bucket control valve 20B, and an auxiliary control valve 20C.

The boom control valve 20A controls the hydraulic actuator (boom cylinder 14) that actuates the boom 10. The boom control valve 20A is a four-position switching valve. The boom control valve 20A is switched between a neutral position 20*a*3, a first position 20*a*1, a second position 20*a*2, and a third position 20*a*4. In the boom control valve 20A, the switching between the neutral position 20*a*3, the first position 20*a*1, the second position 20*a*2, and the third position 20*a*4 is performed by a switching valve (not shown) that is switched by means of an operation member.

The boom control valve 20A is connected to the first hydraulic pump P1 through an output fluid line 27. A section of the output fluid line 27 between the boom control valve 20A and the first hydraulic pump P1 is connected to a discharge fluid line 24, which is connected to the operation fluid tank 15. A relief valve (main relief valve) 25 is provided in the middle of the discharge fluid line 24. The operation fluid output from the first hydraulic pump P1 is supplied to the boom control valve 20A through the output fluid line 27. The boom control valve 20A is connected to the boom cylinder 14 through fluid lines 21.

More specifically, the boom cylinder 14 includes a cylindrical body 14*a*, a rod 14*b* movably provided on the cylindrical body 14*a*, and a piston 14*c* provided on the rod 14*b*. Provided on the proximal end of the cylinder 14*a* (the opposite side of the rod 14*b*) is a first boom port 14*d* for supplying and discharging the operation fluid. Also provide on the distal end of the cylinder 14*a* (the side of the rod 14*b*) is a second boom port 14*e* for supplying and discharging the operation fluid.

The fluid lines 21 has a communication fluid line 21*a* that connects a first port 31 of the boom control valve 20A and the first boom port 14*d* of the boom cylinder 14, and a communication fluid line 21*b* that connects a second port 32 of the boom control valve 20A and the second boom port 14*e* of the boom cylinder 14.

Therefore, the boom control valve 20A switched to the first position (boom-up position) 20*a*1 allows the operation fluid to be supplied from the communication fluid line 21*a* to the first boom port 14*d* of the boom cylinder 14, and to be discharged from the second boom port 14*e* of the boom cylinder 14 to the communication fluid line 21*b*. This extends the boom cylinder 14 to cause the boom 10 to move upward.

Also, the boom control valve 20A switched to the second position (boom-down position) 20*a*2 allows the operation fluid to be supplied from the communication fluid line 21*b* to the second boom port 14*e* of the boom cylinder 14, and to be discharged from the first boom port 14*d* of the boom cylinder 14 to the communication fluid line 21*a*. This contracts the boom cylinder 14 to cause the boom 10 to move downward.

In addition, the boom control valve 20A switched to the third position (floated position) allows the operation fluid to be discharged from the boom cylinder 14 to the discharge fluid line 24 through the communication fluid lines 21*a*, 21*b* and the boom control valve 20A. This keeps the boom cylinder 14 in a floated condition.

The bucket control valve 20B controls the hydraulic cylinder (bucket cylinder 17) that controls the bucket 11. The bucket control valve 20B is a three-position switching valve. The bucket control valve 20B is switched between a neutral position 20*b*3, a first position 20*b*1 and a second position 20*b*2. In the bucket control valve 20B, the switching between the neutral position 20*b*3, the first position 20*b*1, and the second position 20*b*2 is performed by a switching valve (not shown) that is switched by means of the operation member.

The bucket control valve 20B is connected to the bucket cylinder 17 through fluid lines 22. More specifically, the bucket cylinder 17 includes a cylinder 17*a*, a rod 17*b* movably provided on the cylinder 17*a*, and a piston 17*c* provided on the rod 17*b*. Provided on the proximal end of the cylinder 17*a* (the opposite side of the rod 17*b*) is a first bucket port 17*d* for supplying and discharging operation fluid. Also provide on the distal end of the cylinder 17*a* (the side of the rod 17*b*) is a second bucket bucket port 17*e* for supplying and discharging operation fluid.

Fluid lines 22 has a first communication fluid line 22*a* that connects a first communication port 35 of the bucket control valve 20B and the second bucket bucket port 17*e* of the bucket cylinder 17, and a second communication fluid line 22*b* that connects a second communication port 36 of the bucket control valve 20B and the first bucket port 17*d* of the bucket cylinder 17.

Therefore, the bucket control valve 20B switched to the first position (scooping position) 20*b*1 allows the operation fluid to be supplied from the first communication fluid line 22*a* to the second bucket port 17*e* of the bucket cylinder 17, and to be discharged from the first bucket bucket port 17*d* of the bucket cylinder 17 to the second communication fluid line 22*b*. This contracts the bucket cylinder 17 to cause the bucket 11 to perform a scooping operation.

Also, the bucket control valve 20B switched to the second position (dumping position) 20*b*2 allows the operation fluid to be supplied from the second communication fluid line 22*b* to the first bucket port 17*d* of the bucket cylinder 17, and to be discharged from the second bucket port 17*e* of the bucket cylinder 17 to the first communication fluid line 22*a*. This extends the bucket cylinder 17 to cause the bucket 17 to perform a dumping operation. Thus, in the working machine 1, the bucket 17 is configured to perform the dumping operation as the bucket cylinder 17 is extended.

The auxiliary control valve 20C controls the auxiliary attachment, i.e., the hydraulic actuator (hydraulic machines such as a hydraulic cylinder, a hydraulic motor, and the like) attached to a working tool. The auxiliary control valve 20C is a three-position switching valve. The auxiliary control valve 20C is switched between a neutral position 20*c*3, a first position 20*c*1 and a second position 20*c*2. In the auxiliary control valve 20C, the switching between the neutral position 20*c*3, the first position 20*c*1, and the second position 20*c*2 is performed by a switching valve (not shown) that is switched by means of the operational member. The auxiliary control valve 20C is connected to the hydraulic actuator of the auxiliary attachment through supplying/discharging fluid lines 83*a*, 83*b*.

Therefore, the auxiliary control valve 20C switched to the first position 20*c*1 allows the operation fluid to be supplied from the supplying/discharging fluid line 83*a* to the hydraulic actuator of the auxiliary attachment. Also, the auxiliary control valve 20C switched to the second position 20*c*2 allows the operation fluid to be supplied from the supplying/discharging fluid line 83*b* to the hydraulic actuator of the auxiliary attachment. As such, the auxiliary control valve 20C supplies the operation fluid to the hydraulic actuator through either one of the supplying/discharging fluid lines 83*a*, 83*b* to actuate the hydraulic actuator (auxiliary attachment).

In the hydraulic system, a series circuit (series fluid line) is employed, in which, for example, the boom control valve 20A is arranged upward and connected to the bucket control valve 20B. In the series circuit, the operation fluid which returns from the hydraulic actuator (e.g., the boom cylinder 14) to an upstream control valve (e.g., the boom control valve 20A) can be supplied to a downstream control valve (e.g., the bucket control valve 20B).

Hereinafter, upstream and downstream control valve will be referred to as "first" and "second" control valves, respectively. Another control valve, which is different from the first and second control valves and provided downstream of the second control valve, will be referred to as a "third" control valve.

Furthermore, the hydraulic actuators which are actuated by the first, second and third control valves will be referred to as "first", "second" and "third" hydraulic actuators, respectively. Also, the operation fluid which flows back from the first hydraulic actuator into the first control valve will be referred to as "return fluid", and a fluid line which allows the return fluid to flow from the first control valve to the second valve will be referred to as a "first fluid line".

In this embodiment, the boom control valve 20A is the "first control valve," the bucket control valve 20B is the "second control valve," and the auxiliary control valve 20C is the "third control valve." Furthermore, the boom cylinder 14 is the "first hydraulic actuator," the bucket cylinder 17 is the "second hydraulic actuator," and the hydraulic actuator of the auxiliary attachment is the "third hydraulic actuator."

Referring to drawings, the first control valve (boom control valve 20A) will be described in detail hereinafter.

As illustrated in FIG. 1, the boom control valve 20A is connected to an output port of the first hydraulic pump P1 through the output fluid line 27 which guides the operation fluid from the first hydraulic pump P1 into the boom control valve 20A. The boom control valve 20A is connected to the bucket control valve 20B through a central fluid line 51 which connects an output port 41*c* of the boom control valve 20A to first and second input ports 42*a*, 42*c* of the bucket control valve 20B.

When the first control valve (boom control valve 20A) is switched to the neutral position 20*a*3, the operation fluid guided from the output fluid line 27 to the boom control valve 20A passes through the boom control valve 20A to the central fluid line 51.

The first control valve (boom control valve 20A) has internal fluid paths 61 (first and second internal fluid paths 61*a*, 61*b*) provided therein. The internal fluid paths 61 are configured to guide the return fluid from the boom cylinder 14 (the first hydraulic actuator) through the boom control valve 20A and the central fluid line 51 to the bucket control valve 20B.

The internal fluid paths 61 has a first internal fluid path 61*a* and a second internal fluid path 61*b*. The first internal fluid path 61*a* allows fluid communication between the second port 32 and an output port 41*c* thereof when the first control valve (boom control valve 20A) is at the first position 20*a*1. The second internal fluid path 61*b* allows fluid communication between the first port 31 and the output port 41*c* when the first control valve (boom control valve 20A) is at the second position 20*a*2.

Thus, the first control valve (boom control valve 20A) is configured at the first position 20*a*1, to guide the operation fluid (return fluid), which has flown back from the boom cylinder 14 (first hydraulic actuator) to the second port 32, to the second control valve (bucket control valve 20B) through the first internal fluid path 61*a* and the central fluid line 51. Also, the first control valve (boom control valve 20A) is configured at the second position 20*a*2, to guide the operation fluid (return fluid) to the second control valve (bucket control valve 20B) through the second internal fluid path 61*b* and the central fluid line 51.

Next, the second control valve (bucket control valve 20B) will be described in detail hereinafter.

The bucket control valve 20B has an output port 43*c*. The output port 43*c* is connected to a central fluid line 72 that connects with the third control valve (auxiliary control valve 20C). As illustrated in FIG. 2, the second control valve (bucket control valve 20B) has an internal fluid path 90 to allow fluid communication between the second input port 42*c* and the output port 43*c* when the bucket control valve 20B is at the neutral position 20*b*3. Thus, the bucket control valve 20B at the neutral position 20*b*3 guides the operation fluid from the second input port 42*c* through the internal fluid path 90, the output port 43*c* and the central fluid line 72 to the auxiliary control valve 20C.

Figure 2A:
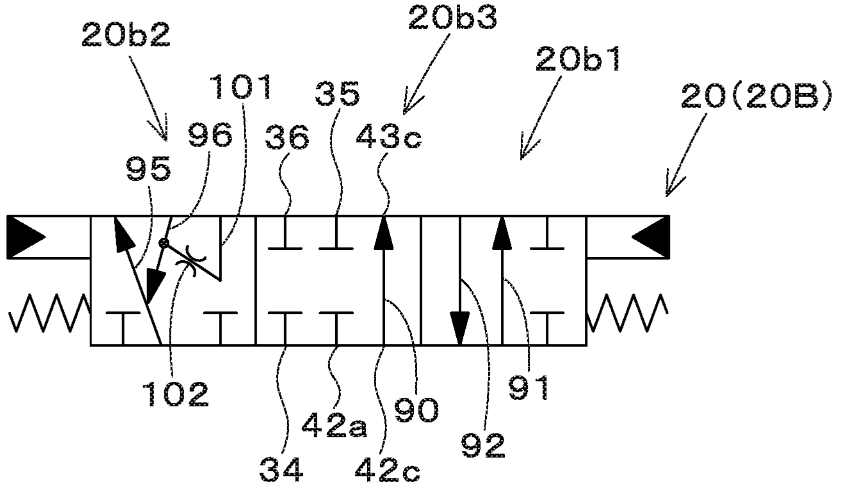
FIG. 2A shows details of a second control valve.

As illustrated in FIG. 2A, the bucket control valve 20B has an internal fluid path 91 to allow fluid communication between the first input port 42*a* and the first communication port 35, and another internal fluid path 92 to allow fluid communication between the second communication port 36 and the discharge port 34 when the bucket control valve 20B is at the first position 20*b*1. As illustrated in FIG. 1, the discharge port 34 is connected to the discharge fluid line 24. Therefore, the bucket control valve 20B switched to the first position 20*b*1 contracts the bucket cylinder 17 (second hydraulic actuator) and discharges the operation fluid from the bucket cylinder 17 to the discharge fluid line 24 through the second communication fluid line 22*b*, the second communication port 36, the internal fluid path 92 and the discharge port 34.

As shown in FIG. 2A, the bucket control valve 20B also has an internal fluid path (which may be referred to as a first supply path) 95 to allow fluid communication between the first input port 42*a* and the second communication port 36 when the bucket control valve 20B is at the second position 20*b*2. Furthermore, the bucket control valve 20B has an internal fluid path (which may be referred to as a regeneration path) 96 coupled with the first communication port 35 and merged with the first supply path 95 when the bucket control valve 20B is at the second position 20*b*2. Therefore, the bucket control valve 20B switched to the second position 20*b*2 extends the bucket cylinder 17 (second hydraulic actuator) and guides the operation fluid from the bucket cylinder 17, for regeneration thereof, back to the second communication fluid line 22*b* through the first communication port 35, the regeneration path 96, the first supply path 95 and the second communication port 36.

Also, as shown in FIG. 2A, the second control valve (bucket control valve 20B) has an internal fluid path (which may be referred to as a branched path) 101 branched from the regeneration path 96 and coupled with the output port 43*c*. The branched path 101 has a first throttle 102 provided therein. Therefore, the second control valve (bucket control valve 20B) switched to or at the second position 20*b*2 may guide a portion of the operation fluid or the return fluid from the bucket cylinder 17 (second hydraulic actuator) to the third control valve (auxiliary control valve 20C) through the first communication fluid line 22*a*, the first communication port 35, the regeneration path 96, the branched path 101 and the output port 43*c* (central fluid line 72) connected to the third control valve (auxiliary control valve 20C). This allows extending the bucket cylinder 17 quickly with an increased amount of the operation fluid thereto whereas maintaining the operation fluid to be supplied to the third control valve (auxiliary control valve 20C) for actuating the third actuator.

Figure 2B:
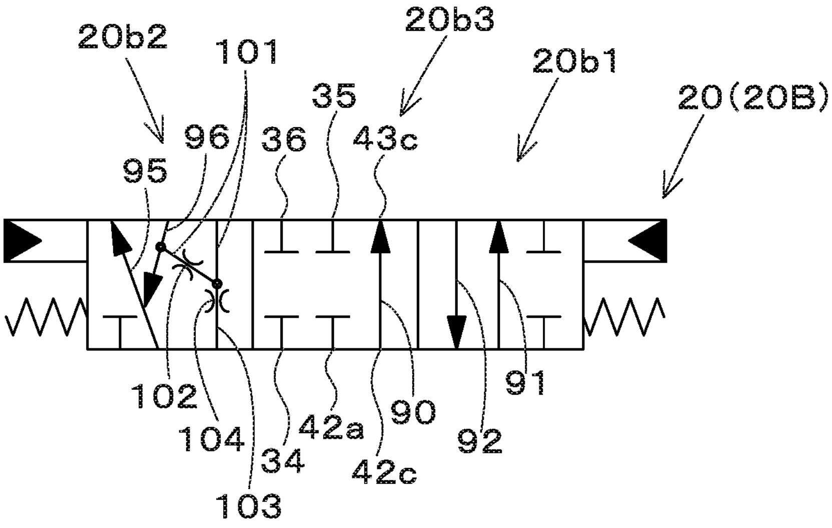
FIG. 2B shows a modified example of the second control valve.

In addition, as shown in FIG. 2B, the bucket control valve 20B may have another internal fluid path (which may be referred to as a second supply path) 103 to allow fluid communication between the second input port 42*c* and the branched path 101, when the bucket control valve 20B is at the second position 20*b*2. Also, the bucket control valve 20B may have a second throttle 104 provided in the second supply path 103. Therefore, when the bucket control valve 20B is switched to the second position 20*b*2 for extending the bucket cylinder 17, the bucket control valve 20B may guide both of the portion of the return fluid from the first communication fluid line 22*a* and the operation fluid from the second input port 42*c*, through the output port 43*c* (central fluid line 72) to the third control valve (auxiliary control valve 20C) downstream of the second control valve (bucket control valve 20B).

Figure 2C:
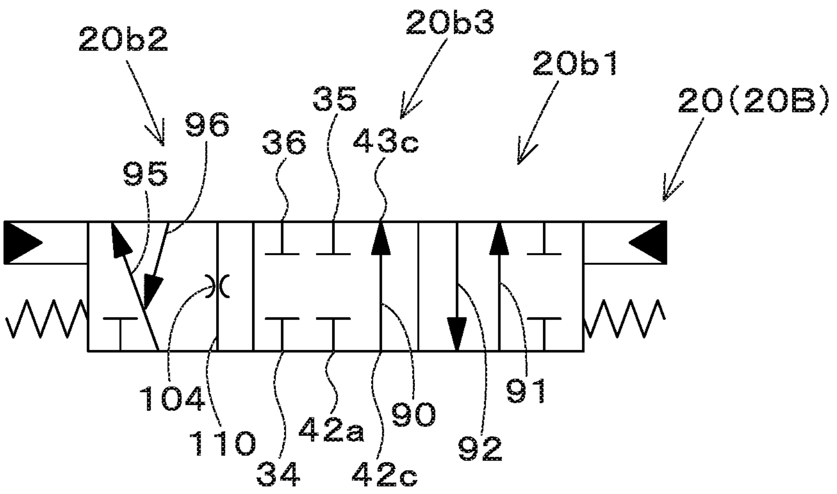
FIG. 2C shows another modified example of the second control valve.

Alternatively, as shown in FIG. 2C, the second control valve (bucket control valve 20B) may have further another internal fluid path (which may be referred to as a third supply path) 110 to allow fluid communication between the second input port 42*c* and the output port 43*c* at the second position 20*b*2. When switched to the second position 20*b*2 for extending the bucket cylinder 17, the bucket control valve 20B may guide the operation fluid from the second input port 42*c* through the third supply path and the output port 43*c* (central fluid line 72) to the auxiliary control valve 20C.

Figure 2D:
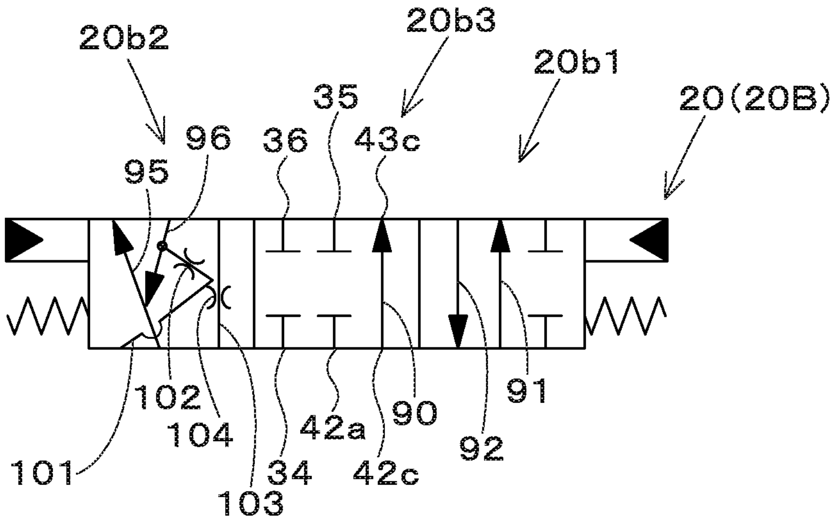
FIG. 2D shows a further modified example of the second control valve.

Further another embodiment as illustrated in FIG. 2D will be discussed below. In the embodiment described above, the branched path 101 is connected to the output port 43*c* for fluid communication with the central fluid line 72 and the third control valve (auxiliary control valve 20C) downstream of the second control valve (bucket control valve 20B). Alternatively, as illustrated in FIG. 2D, another branched path 101 may be connected between the regeneration path 96 and the discharge port 34 for fluid communication with the discharge fluid line 24 and a suction section of the hydraulic pump, and the like (e.g., an operation fluid tank 15 for discharging operation fluid). Also, the second control valve (bucket control valve 20B) may have the second supply path 103 and the second throttle 104 provided therein. The second supply path 103 connects the second input port 42*c* to the output port 43*c*. Thus, the bucket control valve 20B may guide the operation fluid (return fluid), which has returned from the bucket cylinder 17 (second hydraulic actuator) to the first communication port 35, to the discharge fluid line 24 through the regeneration path 96, the branched path 101 and the discharge port 34.

Although the bucket control valve 20B is illustrated in FIG. 2D as having the second supply path 103 and the second throttle 104 provided therein, alternatively, the bucket control valve 20B may be configured without the second supply path 103 and the second throttle 104.

In the embodiment described above, when the second control valve (bucket control valve 20B) is at the first position 20*b*1, the operation fluid (return fluid), which has returned from the bucket cylinder 17 (second hydraulic actuator) to the second control valve (bucket control valve 20B), is discharged through the discharge fluid line 24. However, alternatively, the hydraulic system may have another series circuit, in which the second control valve (bucket control valve 20B) is configured, when switched to the first position 20*b*1, to guide the return fluid to the downstream or third control valve (auxiliary control valve 20C) instead to the discharge fluid line 24, for example, by means of another internal fluid path provided therein for fluid communication between the second communication port 36 and the output port 43*c* (and the central fluid line 72).

The hydraulic system for the working machine according to one aspect of the invention includes the hydraulic actuator (bucket cylinder 17) configured to be operated by operation fluid, the control valve (bucket control valve 20B) connected to the hydraulic actuator 17, and the communication fluid lines 22*a* and 22*b* for fluid communication between the bucket cylinder 17 and the control valve 20B. The bucket control valve 20B includes the first supply path 95 to guide the operation fluid toward the bucket cylinder 17, the regeneration path 96 to guide the operation fluid having been returned to the bucket control valve 20B from the bucket cylinder 17, to the first supply path 95, and the branched path 101 that branches from the regeneration path 96 and supplies the operation fluid to outside of the bucket control valve 20B.

This structure allows the operation fluid or the return fluid having been returned to the bucket control valve 20B from the hydraulic actuator (bucket cylinder 17) to be guided, back to the first supply path 95, which in turn quickly move or extend the hydraulic actuator (bucket cylinder 17). Also, a portion of the return fluid flows through the regeneration path 96 and the branched path 101 to the outside (output port 43*c*), which is available to provide reliable power with the auxiliary actuator, i.e., by guiding the returned fluid to the third control valve (auxiliary control valve 20C) through the regeneration path 96 and the branched path 101.

The control valve (bucket control valve 20B) can be switched between the first position 20*b*1 at which the hydraulic actuator (bucket cylinder 17) contracts and the second position 20*b*2 at which the bucket cylinder 17 extends. The first supply path 95, the regeneration path 96 and the branched path 101 are configured to guide the operation fluid when the bucket control valve 20B is switched to the second position 20*b*2. This allows extending the bucket cylinder 17 quickly with an increased amount of the operation fluid through the first supply path 95 from the firs input port 42*a* together with the return fluid merged into the first supply path 95 from the regeneration path 96.

The branched path 101 is connected to the output port 43*c* for supplying the operation fluid toward another control valve (e.g., auxiliary control valve 20C) disposed downstream of the control valve (bucket control valve 20B). This easily bypasses a part of the operation fluid passing through the regeneration path 96 from the branched path 101 to the output port 43*c* (another control valve).

The branched path 101 is connected to the discharge port 34 that communicates with the discharge fluid line 24 for discharging the operation fluid to the outside of the control valve (bucket control valve 20B). This easily bypasses a part of the operation fluid passing through the regeneration path 96 from the branched path 101 to the discharge port 34 (discharge fluid line 24).

The branched path 101 has the first throttle 102. This enables the operation fluid passing through the regeneration path 96 to be discharged (bypassed) to the outside of the control valve (bucket control valve 20B) in a good balance.

The branched path 101 is connected to the second supply path 103 connected to the second input port 42*c* for supplying operation fluid into the control valve (bucket control valve 20B). This enables the operation fluid to be supplied to another control valve (downstream control valve) via the second supply path 103 and the branched path 101 when multiple hydraulic actuators (e.g., the bucket cylinder 17 and the auxiliary actuator) are actuated, thereby smoothly performing multiple operations thereof.

The second supply path 103 has the second throttle 104. This enables the operation fluid to be supplied to another control valve (downstream control valve) in a good balance.

The hydraulic system for the working machine includes the bucket 11, as well as the working tool (auxiliary attachment) provided on the boom separate from the bucket 11. The hydraulic actuator is the bucket cylinder 17 for actuating the bucket 11. In particular, the operation fluid can be regenerated when the bucket 11 (working tool) performs a dumping operation by extending the bucket cylinder 17, i.e., when a relatively small force is required for the dumping operation.

The embodiments disclosed herein are illustrative in all aspects and should not be construed as limiting the scope of the present invention. The scope of the present invention is defined by the terms of the claims, rather than those in the embodiments described above. Further, it is intended that the scope of the present invention includes all modifications within the meaning and scope equivalent to the claims. The first control valve and the second control valve are not limited to the embodiments described above, and may be any control valves provided in the working machine.

In the embodiment described above, the operation fluid is discharged to the operation fluid tank 15. However, the operation fluid may be discharged to a different portion. More specifically, the fluid line for discharging the operation fluid may be connected to a portion other than the operation fluid tank 15. For example, the fluid line may be connected to the suction section of the hydraulic pump (the portion for sucking the operation fluid) or some other portions.

In the embodiment described above, the control valve is a three-position switching valve. However, the number of positions to be selected in the switching is not limited. The control valve may be a two-position switching valve, a four-position switching valve, or any other switching valve. In the embodiment described above, the hydraulic pump is a fixed-displacement pump. However, the hydraulic pump may be, for example, a variable displacement pump that changes its output volume by changing the swash plate, or any other hydraulic pump.

Further, the first hydraulic actuator, the second hydraulic actuator, the third hydraulic actuator, the first control valve, the second control valve, and the third control valve are not limited to the embodiments described above insofar as they can be provided in the working machine 1.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A hydraulic system for a working machine, comprising:

a hydraulic actuator configured to be operated by operation fluid;

a first control valve connected to the hydraulic actuator;

a second control valve disposed downstream of the first control valve;

a communication fluid line for fluid communication between the hydraulic actuator and the control valve; and a discharge fluid line to discharge the operation fluid from the first control valve, wherein the first control valve comprises:

a first input port, a first communication port, a second communication port, an output port, and a discharge port;

a first supply path from the first input port to the second communication port to guide the operation fluid toward the hydraulic actuator;

a regeneration path from the first communication port to the first supply path to guide the operation fluid having been returned to the first control valve from the hydraulic actuator, to the first supply path and not to the discharge fluid line through the discharge port; and a branched path that branches from the regeneration path and supplies the operation fluid to the second control valve and not to the discharge fluid line, and wherein the discharge port is disconnected or isolated from the regeneration path and the branched path, to prevent fluid communication from the regeneration path and the branched path to the discharge port, and wherein the branched path has a first throttle.

2. The hydraulic system for the working machine according to claim 1, wherein the first control valve is configured to be switched between a first position at which the hydraulic actuator retracts and a second position at which the hydraulic actuator extends, and the operation fluid is guided through the first supply path, the regeneration path, and the branched path when the first control valve is at the second position.

3. The hydraulic system for the working machine according to claim 2, wherein the branched path is connected to the output port through which the operation fluid flows out, for supplying the operation fluid toward the second control valve disposed downstream of the first control valve.

4. The hydraulic system for the working machine according to claim 1, wherein the first control valve further comprises:

a second input port through which the operation fluid flows in; and a second supply path connected to the second input port, wherein the branched path is connected with the second supply path.

5. The hydraulic system for the working machine according to claim 1, wherein a second supply path has a second throttle.

6. The hydraulic system for the working machine according to claim 1, further comprising a bucket provided on a boom, wherein the hydraulic actuator is a bucket cylinder for actuating the bucket.

7. A hydraulic system for a working machine, comprising:

a hydraulic actuator configured to be operated by operation fluid;

a first control valve connected to the hydraulic actuator;

a second control valve disposed downstream of the first control valve;

first and second communication fluid lines for fluid communication between the hydraulic actuator and the first control valve; and a discharge fluid line to discharge the operation fluid from the first control valve to an operation fluid tank, wherein the first control valve comprises:

first and second communication ports connected to the first and second communication fluid lines, respectively:

first and second input ports through which the operation fluid flows in;

an output port through which the operation fluid flows out toward the second control valve;

a discharge port connected to the discharge fluid line;

a first supply path for fluid communication between the first input port and the second communication port;

a regeneration path for fluid communication from the first communication port to the first supply path and not to the discharge port; and a branched path for fluid communication from the regeneration path to the output port and not to the discharge port, and wherein the discharge port is disconnected or isolated from the regeneration path and the branched path, to prevent fluid communication from the regeneration path and the branched path to the discharge port, and wherein the first control valve further comprises a second supply path for fluid communication between the second input port and the output port through the branched path.

8. The hydraulic system for the working machine according to claim 7, wherein the first control valve is configured to be switched from a neutral position to a first position for retracting the hydraulic actuator and a second position for extending the hydraulic actuator.

9. The hydraulic system for the working machine according to claim 8, wherein the operation fluid is guided from the first input port through the first supply path, the second communication port and the second communication fluid line to the hydraulic actuator, when the first control valve is switched to the second position.

10. The hydraulic system for the working machine according to claim 9, wherein the operation fluid is guided from the hydraulic actuator to the first supply path through the first communication port and the regeneration path, when the first control valve is switched to the second position.

11. The hydraulic system for the working machine according to claim 10, wherein the operation fluid is guided from the regeneration path to the output port through the branched path, when the first control valve is switched to the second position.

12. The hydraulic system for the working machine according to claim 11, wherein the operation fluid is guided from the output port to the second control valve disposed downstream of the first control valve, when the first control valve is switched to the second position.

13. A hydraulic system for a working machine, comprising:

a hydraulic actuator configured to be operated by operation fluid;

a first control valve connected to the hydraulic actuator;

a second control valve disposed downstream of the first control valve;

a communication fluid line for fluid communication between the hydraulic actuator and the control valve; and a discharge fluid line to discharge the operation fluid from the first control valve, wherein the first control valve comprises:

a first input port, a first communication port, a second communication port, an output outlet port, and a discharge port;

a first supply path from the first input port to the second communication port to guide the operation fluid toward the hydraulic actuator;

a regeneration path from the first communication port to the first supply path to guide the operation fluid having been returned to the first control valve from the hydraulic actuator, to the first supply path and not to the discharge fluid line through the discharge port; and a branched path that branches from the regeneration path and supplies the operation fluid to the second control valve and not to the discharge fluid line, and wherein the discharge port is disconnected or isolated from the regeneration path and the branched path, to prevent fluid communication from the regeneration path and the branched path to the discharge port, wherein the first control valve is configured to be switched between a first position at which the hydraulic actuator retracts and a second position at which the hydraulic actuator extends, and the operation fluid having been returned to the first control valve is guided through the first control valve to the discharge fluid line when the first control valve is at the first position.

14. A hydraulic system for a working machine, comprising:

a hydraulic actuator configured to be operated by operation fluid;

a first control valve connected to the hydraulic actuator;

a second control valve disposed downstream of the first control valve;

first and second communication fluid lines for fluid communication between the hydraulic actuator and the first control valve; and a discharge fluid line to discharge the operation fluid from the first control valve to an operation fluid tank, wherein the first control valve comprises:

first and second communication ports connected to the first and second communication fluid lines, respectively:

first and second input ports through which the operation fluid flows in;

an output port through which the operation fluid flows out toward the second control valve;

a discharge port connected to the discharge fluid line;

a first supply path for fluid communication between the first input port and the second communication port;

a regeneration path for fluid communication from the first communication port to the first supply path and not to the discharge port; and a branched path for fluid communication from the regeneration path to the output port and not to the discharge port, and wherein the discharge port is disconnected or isolated from the regeneration path and the branched path, to prevent fluid communication from the regeneration path and the branched path to the discharge port, wherein the first control valve is configured to be switched between a first position at which the hydraulic actuator retracts and a second position at which the hydraulic actuator extends, and the operation fluid having been returned to the first control valve is guided through the second communication port, the discharge port, and the discharge fluid line when the first control valve is at the first position.

* * * * *